C. A. PFANSTIEHL.
X-RAY TARGET.
APPLICATION FILED SEPT. 25, 1916.
1,279,423.
Patented Sept. 17, 1918.
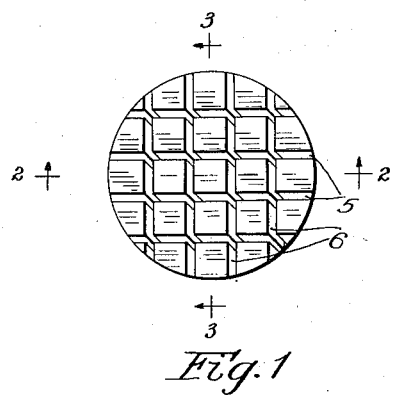
Fig. 1
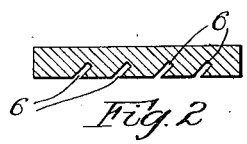  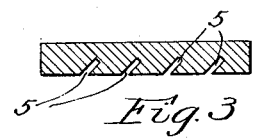
Fig. 2    Fig. 3
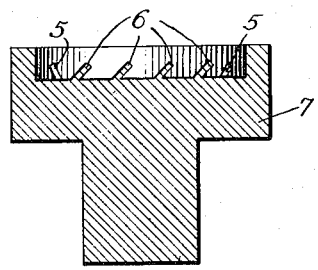
Fig. 4
Witnesses:
Albin C. Ahlberg
Mabel Cave
Inventor
Carl A. Pfanstiehl
By William Bradbury & Lee
Attorneys

UNITED STATES PATENT OFFICE.

CARL A. PFANSTIEHL, OF HIGHLAND PARK, ILLINOIS, ASSIGNOR TO PFANSTIEHL COMPANY, INC., OF NORTH CHICAGO, ILLINOIS, A CORPORATION OF NEW YORK.

X-RAY TARGET.

1,279,423.    Specification of Letters Patent.    Patented Sept. 17, 1918.

Application filed September 25, 1916. Serial No. 122,044.

*To all whom it may concern:*

Be it known that I, CARL A. PFANSTIEHL, a citizen of the United States, residing at Highland Park, in the county of Lake and State of Illinois, have invented a certain new and useful Improvement in X-Ray Targets, of which the following is a full, clear, concise, and exact description, reference being had to the accompanying drawings, forming a part of this specification.

My invention relates to X-ray targets. The object of the invention is to provide a target wherein a disk of polished tungsten is intimately connected with its electrode body of copper so that very rapid conduction of heat will occur between the tungsten and the electrode body, the same means also providing undercuts whereby the target is firmly retained in contact with the copper electrode.

My invention is illustrated in the accompanying drawing, in which—

Figure 1 represents the underside of a tungsten disk;

Fig. 2 a section on the line 2—2 of Fig. 1;

Fig. 3 a section on the line 3—3 of Fig. 1; and

Fig. 4 a section through the electrode showing the tungsten target in place. In this view the tungsten disk is shown in elevation.

These targets are preferably made by compressing finely divided tungsten powder to a pressure of about 150 tons per square inch and then sintering the powder by supporting the disk of compressed material between two tungsten electrodes, and then passing a large current of electricity through the disk so as to heat it to substantially the melting point of tungsten, while at the same time maintaining it under pressure by means of the tungsten electrodes. This operation is carried on in an atmosphere of hydrogen to prevent the tungsten from becoming oxidized during the sintering operation.

Tungsten thus sintered is very hard and in fact so hard that it cannot be cut with steel tools. In order, therefore, to secure undercuts by means of which the target of tungsten can be held throughout its entire area in contact with the copper electrode which forms its support, I cut a plurality of saw grooves partially through the unsintered tungsten disk, the saw being manipulated at an angle to the plane of the disk. I have found it preferable also to saw slots in the disk in two directions at angles to one another, as shown at 5 and 6. These saw cuts may be made in the disk after it has been sintered by the use of saws formed of carborundum, hard rubber and sodium silicate such as described in my Patent No. 1,210,358, dated December 26, 1916.

After the disks are thus formed they are placed in the bottom of a mold of refractory material and therein heated in the presence of copper, which may, if desired, be simultaneously molded into the shape of the electrode 7 for use in X-ray tubes. This melting operation, if carried on in a vacuum or in an atmosphere of hydrogen, causes the copper to actually wet the surface of the tungsten and to adhere to the tungsten not only throughout all of the original surface but also to the walls and base of the saw cuts made therein. It is not, however, necessary that an actual wetting of the surface of the tungsten take place, since by reason of the increased area of contact between the copper and the tungsten brought about by the saw cuts the radiation of heat from the tungsten to the copper is sufficient without more than a mechanical connection between the two, the undercuts throughout the surface of contact serving as a mechanical attaching medium to prevent the central portion of the target from arching away from the copper support due to heat and expansion.

It is to be understood that other forms of undercuts may be adopted without departing from the spirit or scope of my invention.

What I claim is:

1. A target for X-ray tubes comprising a disk of tungsten having undercuts distributed throughout one of its surfaces and a copper electrode cast into contact with said disk, said electrode having projections extending into and engaging the walls of the undercut portions of the disk.

2. A target for X-ray tubes comprising a disk of tungsten having an undercut surface and an electrode of good heat conducting material having projections extending into and engaging the walls of the undercut portions of the disk.

3. A target for X-ray tubes comprising a disk of refractory material having undercuts distributed throughout one of its surfaces and an electrode of good heat conducting material having projections extending into and engaging the walls of the undercut disk.

In witness whereof, I hereunto subscribe my name this 19th day of September, A. D. 1916.

CARL A. PFANSTIEHL.

Witnesses:
CLARENCE W. BALKE,
MARGARET GROBBEN.